United States Patent [19]
Mitchell

[11] Patent Number: 5,288,337
[45] Date of Patent: Feb. 22, 1994

[54] PHOTOVOLTAIC MODULE WITH SPECULAR REFLECTOR

[75] Inventor: Kim W. Mitchell, Granada Hills, Calif.

[73] Assignee: Siemens Solar Industries, L.P., Camrillo, Calif.

[21] Appl. No.: 903,897

[22] Filed: Jun. 25, 1992

[51] Int. Cl.$^5$ .......................................... H01L 31/052
[52] U.S. Cl. .................................. 136/246; 136/244; 136/251
[58] Field of Search ..................... 136/246, 251, 244

[56] References Cited

U.S. PATENT DOCUMENTS

| | | | |
|---|---|---|---|
| 3,427,200 | 2/1969 | Lapin et al. | 136/246 |
| 3,971,672 | 7/1976 | Lampkin | 136/246 |
| 4,002,499 | 1/1977 | Winston | 136/206 |
| 4,053,327 | 10/1977 | Meulenberg, Jr. | 136/256 |
| 4,116,718 | 9/1978 | Yerkes et al. | 136/246 |
| 4,162,928 | 7/1979 | Shepard, Jr. | 136/246 |
| 4,235,643 | 11/1980 | Amick | 136/246 |
| 4,246,042 | 1/1981 | Knasel et al. | 136/246 |
| 4,313,023 | 1/1982 | Stephens | 136/246 |
| 4,316,448 | 2/1982 | Dodge | 126/600 |
| 4,321,417 | 3/1982 | Kurth et al. | 136/246 |
| 4,440,153 | 4/1984 | Melchior | 126/694 |
| 4,493,942 | 1/1985 | Sheng et al. | 136/259 |
| 4,711,972 | 12/1987 | O'Neill | 136/246 |

FOREIGN PATENT DOCUMENTS 55-105383  8/1980  Japan .................................. 136/246

OTHER PUBLICATIONS

J. A. Amick et al, *Conference Record, 15th IEEE Photovoltaic Specialists Conf.* (May 1981), pp. 1376-1381.

S. R. Wenham, et al., "Improved Optical Design for Photovoltaic Cells and Modules", 22nd IEEE Photovoltaic Specialists Conference, Las Vegas, Nevada, Oct., 1991.

*Primary Examiner*—Aaron Weisstuch
*Attorney, Agent, or Firm*—Nilsson, Wurst and Green

[57] ABSTRACT

A photovoltaic module having a plurality of photovoltaic cells disposed behind a front cover portion to receive radiation has at least one specular reflector disposed alongside the cells to direct incident radiation back into the front cover portion and onto the photovoltaic cells for conversion to electrical energy. In a preferred embodiment, the specular reflectors have reflective surfaces of concave curvature configured to reflect incident radiation back into the front cover portion for internal reflection onto the photovoltaic cells.

17 Claims, 5 Drawing Sheets

MODULE I-V CURVE:    CZ (1 string/ 36 segments)  Conc. = 1.425

| | | | |
|---:|---:|---:|---:|
| Jsc(mA/cm2) | 35.9 | Module Length (cm) | 92.2 |
| Voc/cell(25C) | .608 | Module Width (cm) | 20.2 |
| n | 1.67 | Cell Length (cm) | 2.53 |
| T(C) | 25 | Cell Width (cm) | 20.2 |
| Rsq(front) | 55 | Contact Length (cm) | 2.4 |
| Rsq(back) | .001 | Rshunt (ohm-cm2) | 5000 |
| Rc(ohm-cm2) | .0001 | Rseries (ohms) | 0.175 |
| Area(cm2) | 1862.44 | Active Area (%) | 88.6 |
| Isc(A) | 2.345 | Voc (V) | 22.441 |
| Imax(A) | 2.155 | Vmax (V) | 18.136 |
| FF | .743 | Eff (%) | 14.73 |
| Pmax(W) | 39.098 | | |

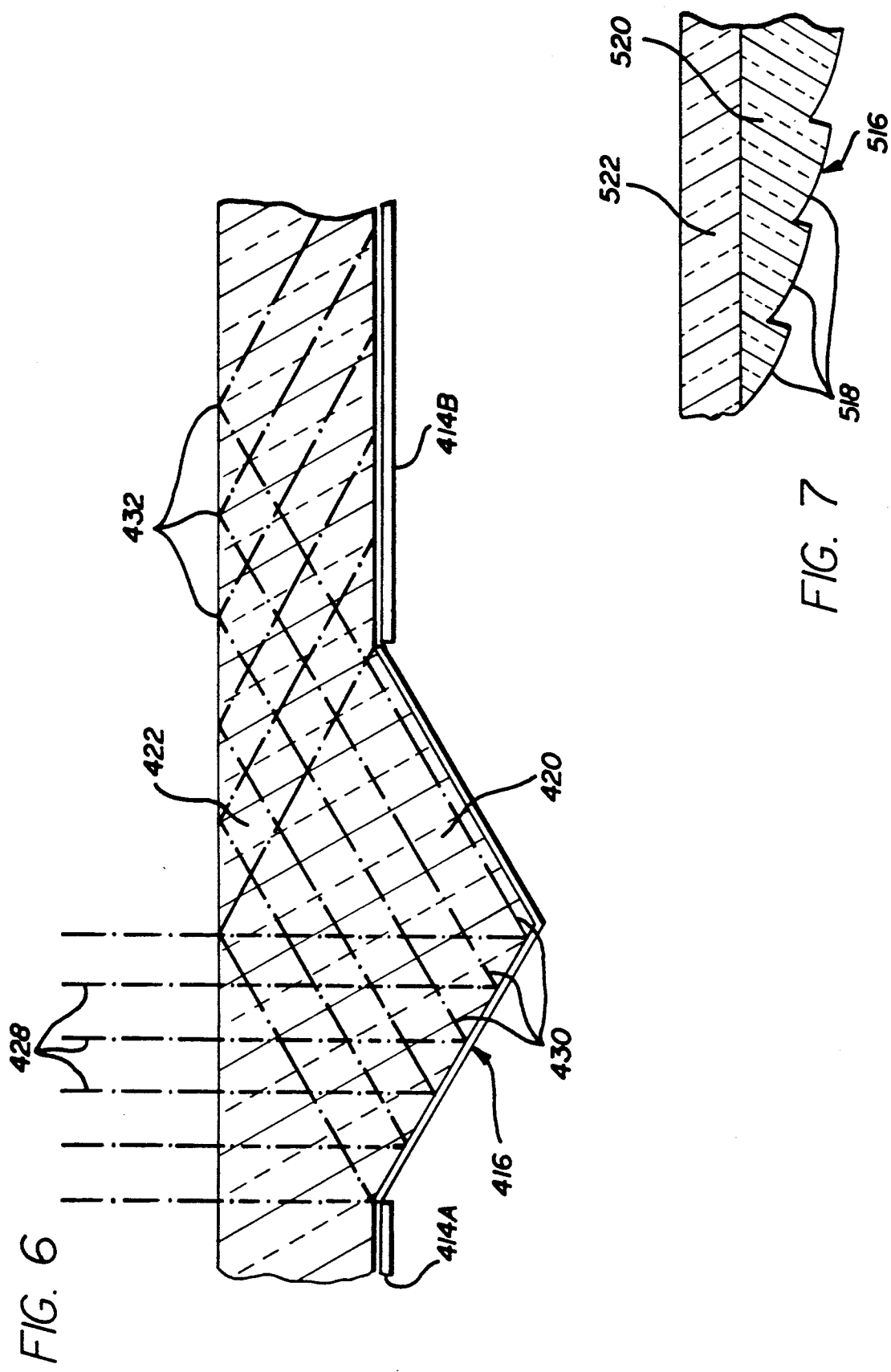

PHOTOVOLTAIC MODULE WITH SPECULAR REFLECTOR

BACKGROUND OF THE INVENTION

The present invention relates generally to photovoltaic modules and, more particularly, to photovoltaic modules having specularly reflective surfaces disposed alongside a plurality of photovoltaic cells to concentrate radiation onto the cells.

Photovoltaic cells are typically connected together in modules to provide electrical power at useful voltage and power levels. The output power produced by a module is directly related to the total radiation impinging upon its cells, including both radiation incident directly on the cells and any radiation reflected and/or refracted onto them by external means.

Designers of photovoltaic power systems have sought to enhance the power produced by a given number of cells by increasing the amount of radiation reaching the cells. Many attempts to do so have made use of three-dimensional mirrors or prism structures placed in front of the light-receiving surface of a photovoltaic cell to "concentrate" incoming radiation. Examples of such systems are found in the following U.S. Pat. No. 3,427,200 to Lapin et al.; U.S. Pat. No. 4,002,499 to Winston; U.S. Pat. No. 4,053,327 to Meulenberg, Jr.; U.S. Pat. No. 4,316,448 to Dodge; U.S. Pat. No. 4,440,153 to Melchior; and U.S. Pat. No. 4,711,972 to O'Neill. The systems of the Lapin et al., Winston, Dodge, and Melchior patents use mirrors extending outwardly from a plane containing the light-receiving face of one or more cells to reflect additional radiation onto the cells. O'Neill and Meulenberg, Jr. disclose the use of refractive covers disposed in front of one or more photovoltaic cells to bend incoming light. They can take the form of a cylindrical lens which captures radiation over a large area and focuses it onto a group of cells (O'Neill, FIG. 5), or a smaller cover placed directly against the face of an individual cell to bend radiation away from grid lines on the cell (O'Neill, FIGS. 1-4 and 6 and Meulenberg, Jr.). Unfortunately, many of the foregoing systems are bulky and expensive to fabricate. Their mirrors or prisms also tend to become obscured by dust and dirt, drastically reducing module efficiency.

Another method of directing additional radiation onto photovoltaic cells is to provide light diffusive surfaces between, above or below the cells, as disclosed in the following U.S. Pat. No. 3,971,672 to Lampkin; U.S. Pat. No. 4,116,718 to Yerkes et al.; U.S. Pat. No. 4,162,928 to Shepard, Jr.; U.S. Pat. No. 4,246,042 to Knasel et al.; U.S. Pat. No. 4,321,417 to Kurth et al.; and U.S. Pat. No. 4,493,942 to Sheng et al. Of these, the Yerkes et al., Shepard, Jr., Knasel et al. and Kurth et al. patents disclose the use of substantially planar diffusive reflectors between the cells of a flat panel photovoltaic module to direct incoming radiation back into a front cover for internal reflection onto an adjacent cell. However, the increase in current achieved in this way is rather small because only a minor portion of the radiation incident on the diffusive reflectors is reflected at an angle suitable for subsequent internal reflection.

Therefore, it is desirable in many applications to provide an improved, low-cost structure for significantly increasing the output of photovoltaic cells by concentrating solar radiation thereon.

SUMMARY OF THE INVENTION

The present invention is an essentially flat photovoltaic module which collects and makes use of radiation falling alongside its photovoltaic cells. Such radiation is specularly reflected back into a transparent front cover of the module at an angle causing it to be reflected by the front cover and to impinge on adjoining cells for conversion to electrical energy. This results in an increase in power proportional to the total reflective area of the module. For a crystalline silicon photovoltaic module of flat panel design, module power can be increased by fifty (50) percent or more using the structure of the invention.

As used herein, "specular reflection" means the type of controlled reflection obtained with a mirror or other smooth reflector, as opposed to the diffuse reflection of prior art flat panel systems. Specular reflectors are used in the system of the present invention to control the direction in which light is reflected, causing most of the reflected light to reach the photovoltaic cells.

In a preferred embodiment, sunlight is reflected back into the front cover at angles causing it to be totally internally reflected by the front cover. This can be accomplished with concave reflective surfaces disposed alongside the cells. The reflective surfaces are located at or behind the plane of the cells and may have compound parabolic curvatures which cause light impinging at different distances from the cells to be reflected at different angles. This permits essentially all of the light impinging on a preselected area adjacent the cells to be redirected into the cells for conversion to electrical energy.

Thus, the reflective photovoltaic module of the present invention comprises: a light-receiving structure having a substantially transparent front cover portion; a plurality of photovoltaic cells disposed behind the front cover portion to receive radiation thereby; and a plurality of specular reflectors behind the front cover portion and alongside the photovoltaic cells to direct radiation incident thereon back into the front cover portion and onto the photovoltaic cells for conversion to electrical energy. In a preferred embodiment, the specular reflectors comprise concave reflective surfaces configured to reflect radiation incident thereon back into the front cover portion for internal reflection onto the photovoltaic cells. The light-receiving structure may further comprise regions of transparent material extending between the front cover portion and the reflective surfaces.

BRIEF DESCRIPTION OF THE DRAWINGS

These and other features of the present be more fully understood from the following detailed description, taken together with the accompanying drawings, wherein similar reference characters refer to similar elements throughout and in which:

FIG. 6 is an enlarged fragmentary cross-sectional view comparable to FIG. 2, but showing a specular reflector constructed according to another embodiment of the present invention; and FIG. 7 is an enlarged fragmentary sectional view of a specular reflector constructed according to a further embodiment of the present invention, wherein a curved surface of the reflector is "collapsed" to reduce its depth.

DESCRIPTION OF THE PREFERRED EMBODIMENTS

Figure 1:
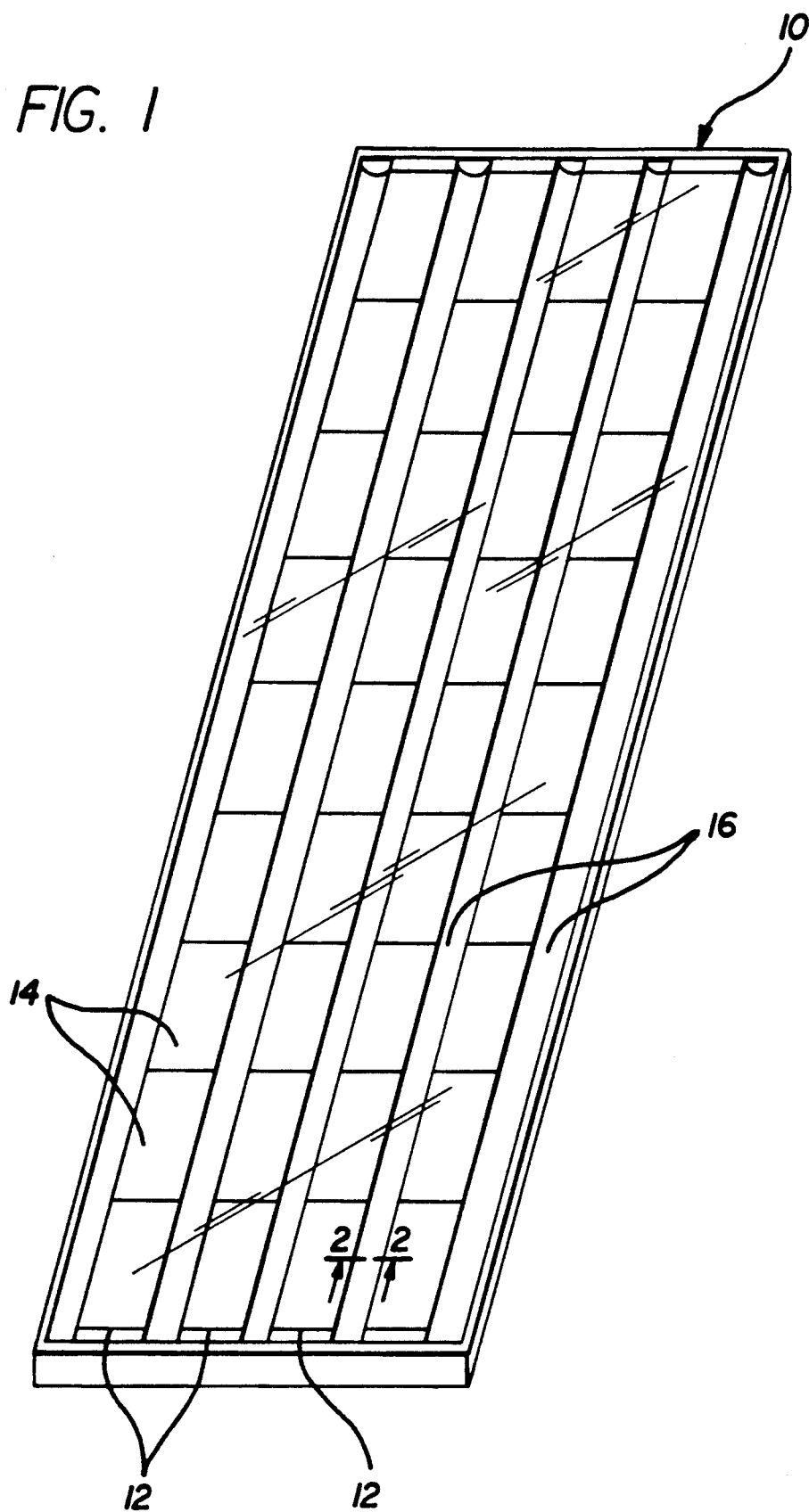
FIG. 1 is an isometric view of an exemplary embodiment of a flat panel reflective photovoltaic module constructed in accordance with a preferred embodiment of the present invention.

As illustrated in FIG. 1, a photovoltaic module 10 constructed according to a preferred embodiment of the present invention has a plurality of strings 12 of photovoltaic or "solar" cells 14 bordered by elongated specular reflectors 16 to capture and utilize radiation incident alongside the cells as well as that impinging directly on the cells.

Figure 2:
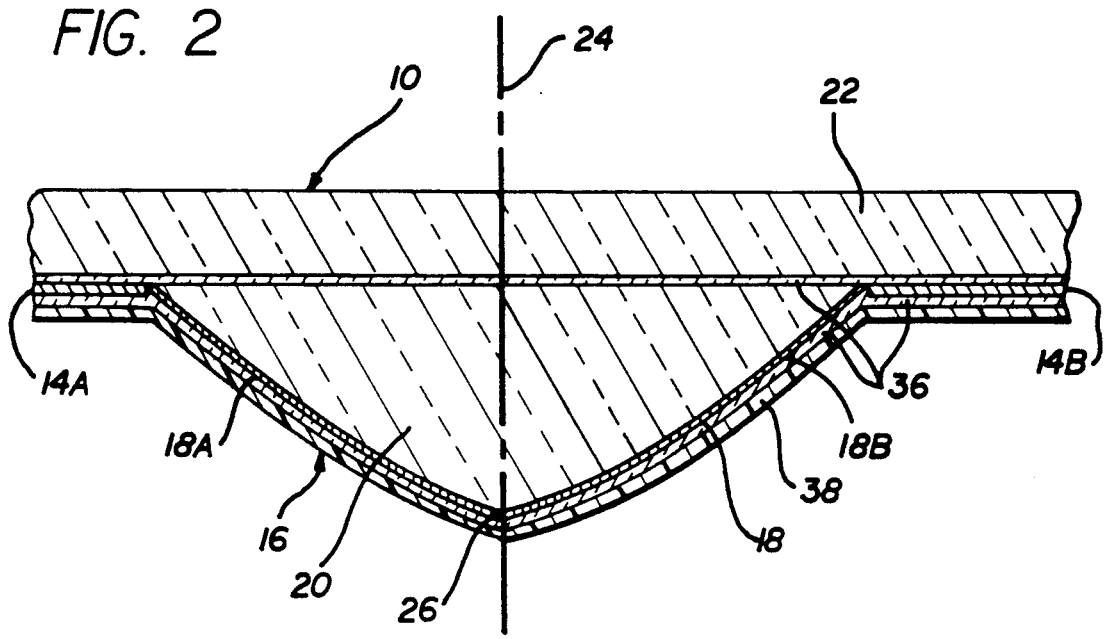
FIG. 2 is an enlarged fragmentary cross-sectional view taken along the line 2—2 of FIG. 1 to show the module of FIG. 1 in the area of a specular reflector thereof.
Figure 3:
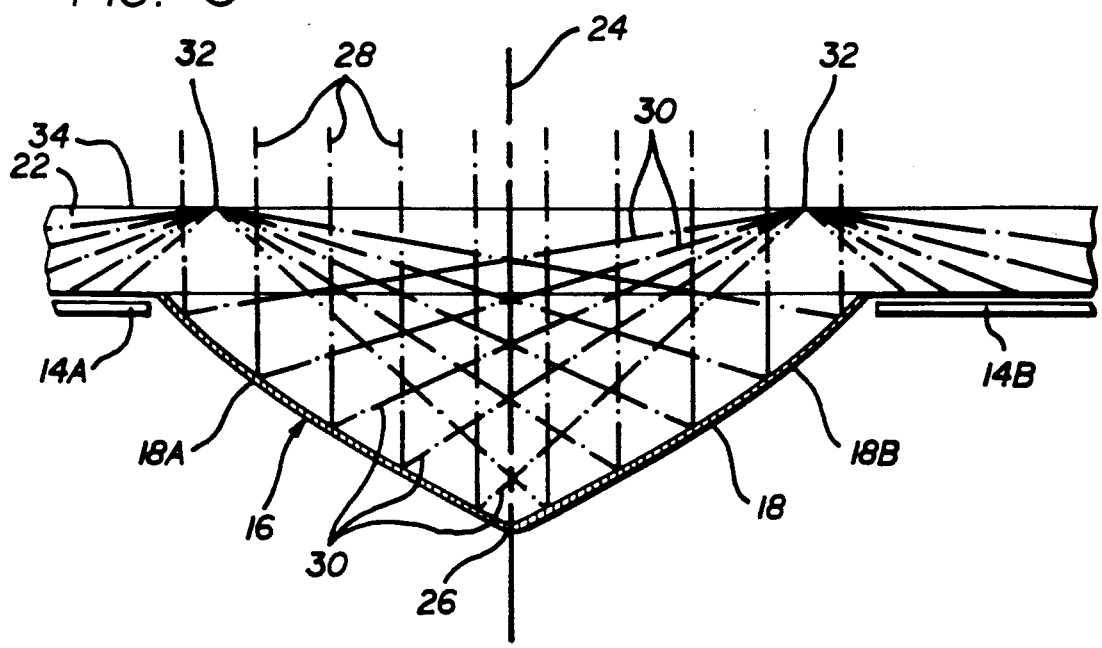
FIG. 3 is a schematic view of the structure of FIG. 2 showing the paths of a plurality of light rays incident thereon.

With reference to FIGS. 2 and 3, each of the elongated specular reflectors 16 has a reflective layer 18 of generally concave curvature disposed behind a region 20 of transparent material to reflect incident radiation back into a transparent front cover 22 for internal reflection onto cells 14A and 14B of adjacent strings 12 (FIG. 1). Transmission of reflected radiation back into the transparent front cover 22 is facilitated by the fact that the region 20 and the front cover 22 have similar indices of refraction. Such radiation is almost totally internally reflected at the outer surface of the front cover 22. This occurs at the angles encountered here because the front cover is in contact with air which has a much lower index of refraction. The curvature of the reflective layer 18 and the refractive index of the front cover are specifically selected to maximize internal reflection. Accordingly, most of the radiation incident on the reflective layer 18 reaches the photovoltaic cells 14A and 14B for conversion to electrical energy.

The reflective layer 18 of the specular reflector 16 forms a trough-like reflective surface symmetric about a central plane 24. It is made up of a first segment 18A on one side and a second segment 18B on the other side of the central plane. The segments are preferably parabolic and meet at an apex 26 to form a reflective surface of compound concave curvature, as shown in FIG. 2. The curvature is such that light impinging on the segment 18A is reflected onto the photovoltaic cell 14B and light incident on the segment 18B is reflected onto the photovoltaic cell 14A.

Operation of the reflective module 10 can be better understood by considering the paths of light rays impinging on the module normal to its transparent front cover 22, as shown at 28 in FIG. 3. Light incident on the first parabolic segment 18A is reflected back into the transparent front cover 22 along a series of paths 30. These paths converge at a region 32 on an outer surface 34 of the transparent front cover 22, and the region of convergence coincides with the focus of the parabola defined by the first parabolic segment 18A. The converged light is reflected internally at the outer surface 34, owing to the relatively low angles of its incidence and the fact that the front cover has a much higher index of refraction than the air that it contacts. Light internally reflected at the outer surface 34 continues along diverging paths which impinge upon the second photovoltaic cell 14B.

Any deviation from the normal incidence illustrated in FIG. 3 will, of course, affect the convergence discussed above and the area over which internally reflected light impinges on the photovoltaic cell 14B. However, the parabolic curvature of the segment 18A and the thicknesses of the various elements are designed so that internally reflected light impinges on the photovoltaic cells for a relatively wide range of angles of incidence at the outer surface 34. In addition, some of the internally reflected light which does not initially impinge upon a photovoltaic cell is reflected again toward the outer surface 34, either by part of the cell structure or by an adjoining mirror segment, and continues to be reflected within the system until it impinges upon one of the other photovoltaic cells.

In the configuration of FIGS. 1-3, the elongated specular reflectors 16 are compound parabolic reflectors having an overall width approximately one-half as great as the width of the photovoltaic cells 14. This causes the amount of light impinging upon the photovoltaic cells to be increased by approximately 50 percent for angles of incidence near the perpendicular, and provides sufficient cell area to receive reflected light over a range of illumination conditions. In a preferred form of the invention, the specular reflectors 16 are 1 inch (2.54 cm) wide and the photovoltaic cells 14 are 2 inches (5.08 cm) wide. Thus, the photovoltaic cells 14 may be conventional 4-inch by 4-inch (10.16 cm × 10.16 cm) photovoltaic cells which have been cut in half and connected together in strings by suitable conductive ribbons or bus structures (not shown). The photovoltaic module 10 has four strings of nine photovoltaic cells, each of which is bordered by one of the elongated specular reflectors 16. It thus has thirty-six 2-inch by 4-inch cells which together are capable of producing approximately 26 watts of power from direct sunlight. The same thirty-six cells, when provided with elongated specular reflectors 16 in the configuration of the module 10, produce between 35 and 40 watts of power when the total reflector efficiency is approximately 85%.

The transparent front cover 22 and the region 20 of the specular reflectors 16 may be made of any material capable of transmitting radiation over a large portion of the solar spectrum and of withstanding extreme temperatures and other environmental conditions. At present, the front cover 22 is preferably made of suitable glass, such as soda lime glass, and the regions 20 are formed of a synthetic polymeric material, such as a transparent acrylic. The acrylic material can be extruded or molded to provide the required shape.

The reflective layer 18 can be metallized in a conventional manner, such as by sputtering or evaporating a suitable metal or by spraying a metal-containing composition on the back surface of the transparent region 20. Alternatively, a separate reflective film can be adhesively applied to the surface. A film suitable for this purpose is a silvered acrylic film sold by 3M Corporation of St. Paul, Minn., under the designation "ECP-300 Silver Solar Reflecting Film".

The module 10 is preferably formed by a lamination process wherein transparent pottant layers 36 bond the different elements together. As shown in FIG. 2, a first pottant layer 36 is positioned directly behind the transparent front cover 22 so that it separates the front cover from the photovoltaic cells 14 and the transparent regions 20. A second pottant layer 36 is then applied behind the photovoltaic cells and the transparent regions 20, followed by an outer protective layer 38. The protective layer 38 is a flexible sheet of water-impermeable material which isolates the photovoltaic cells and the specular reflectors 16 from the environment. In a preferred embodiment, the pottant layers 26 are formed of ethylene vinyl acetate (EVA) approximately 0.018 in. (0.46 mm) thick and the protective layer 38 is a sheet of synthetic material sold by DuPont under the designation "TEDLAR".

The elongated specular reflectors 16 are preferably dimensioned to be approximately one-half as wide as the photovoltaic cells 14. When the photovoltaic cells 14 are 2 inches wide, the elongated specular reflectors 16 are preferably 1 inch wide and approximately 0.30 inches (0.76 cm) thick. The transparent front cover 22 is then preferably a sheet of glass approximately 0.125 inches (0.32 cm) thick. For a photovoltaic cell thickness of 0.015 inches (0.38 mm), the pottant layers 36 are preferably 0.018 inches (0.46 mm) thick. In this configuration, the pottant layers serve both to provide an effective bond between the components and to keep air and moisture out.

From an optical standpoint, the materials of the transparent front cover 22, the transparent regions 20 and the pottant layers 36 preferably have similar indices of refraction. This is true for the materials specified above, all of which have indices of approximately 1.5. By matching indices in this way, undesired reflection is minimized at the boundaries between components of the module. Other than the reflective layer 18, the only place at which reflection is desired is the outer surface 34 of the transparent front cover 22. Internal reflection takes place at the outer surface 34 because the front cover 22 has a significantly higher index of refraction than the air that it contacts. The range of angles over which reflection occurs can be derived from known optical principles using the relative indices of refraction of the materials involved.

It will be appreciated that the specular reflectors 16 disposed at the outer edges of the photovoltaic module 10 direct some light toward the photovoltaic cells 14 and some light away from them. In order to make use of the light directed away from the cells, the edges of the front cover 22 are preferably treated to reflect such light back into the module for eventual absorption by the photovoltaic cells. Useful edge treatments include beveling the edge of the glass and/or providing it with a suitable reflective coating.

Figure 4:
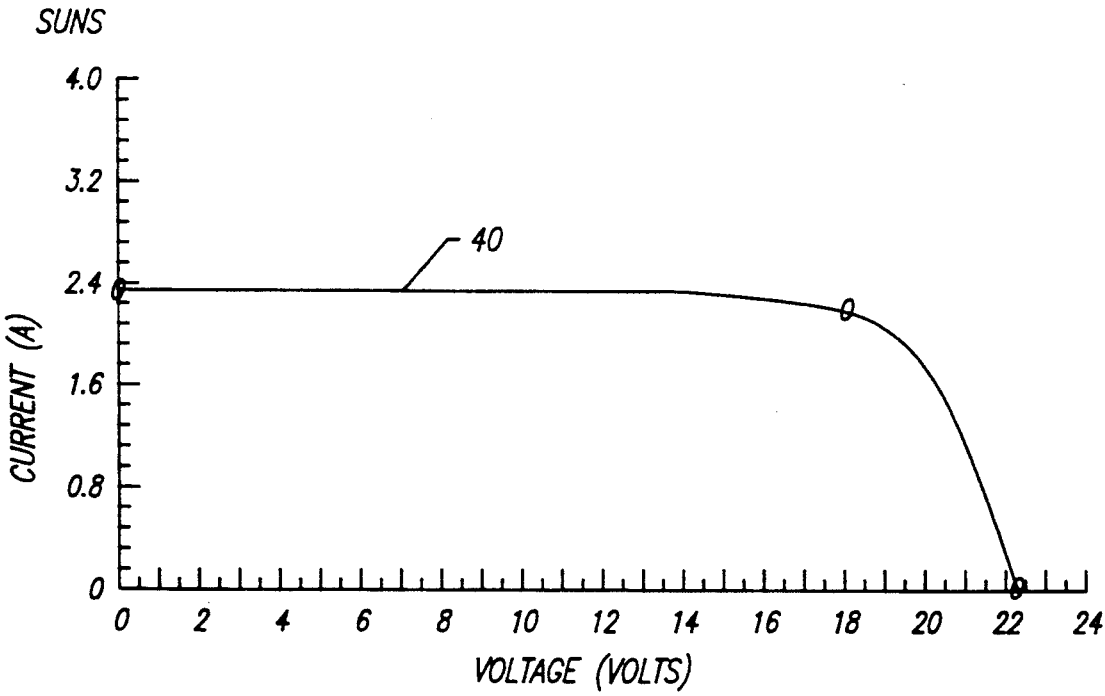
FIG. 4 is graph showing a current-voltage characteristic calculated for the module of FIG. 1.

Referring now to FIG. 4, a current-voltage (I-V) characteristic is shown for the reflective module 10 of FIG. 1, which has four strings of nine segments connected electrically in series. Maximum power of the module 10 is calculated to be slightly over 39 watts, representing an increase of 50% over the output of approximately 26 watts which would result from the same number of cells without the specular reflectors of the present invention.

Figure 5A:
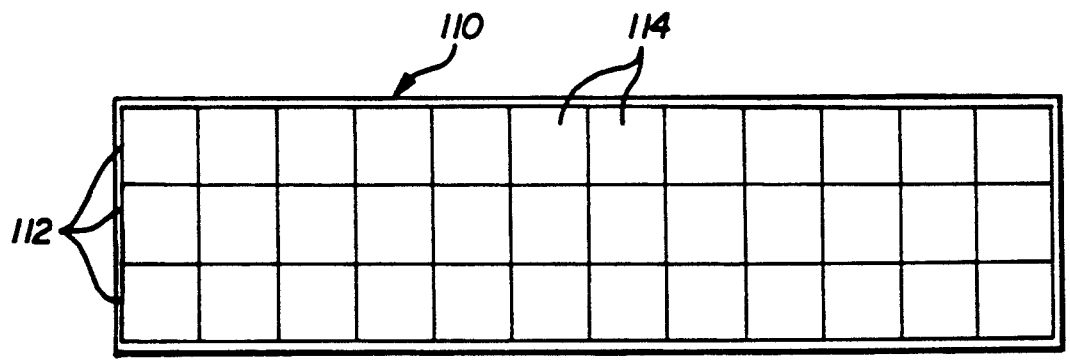
FIG. 5A is a plan view of a photovoltaic module in which a plurality of square photovoltaic cells are provided in a closely-packed configuration characteristic of the prior art.
Figure 5B:
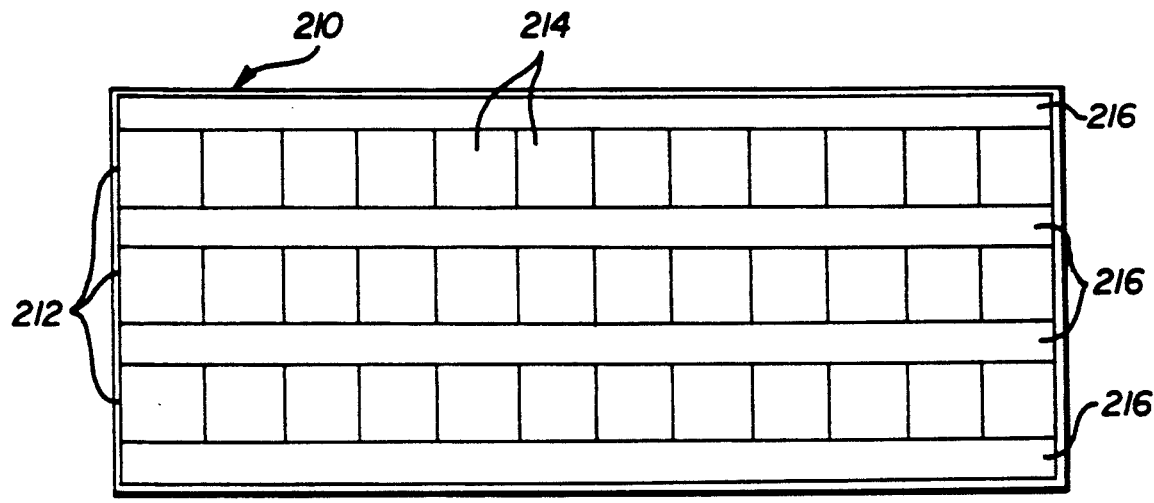
FIG. 5B is a plan view of a photovoltaic module constructed according to an alternative embodiment of the present invention wherein three strings of square photovoltaic cells are spaced apart and bordered by elongated mirror structures for capturing and converting additional solar radiation.
Figure 5C:
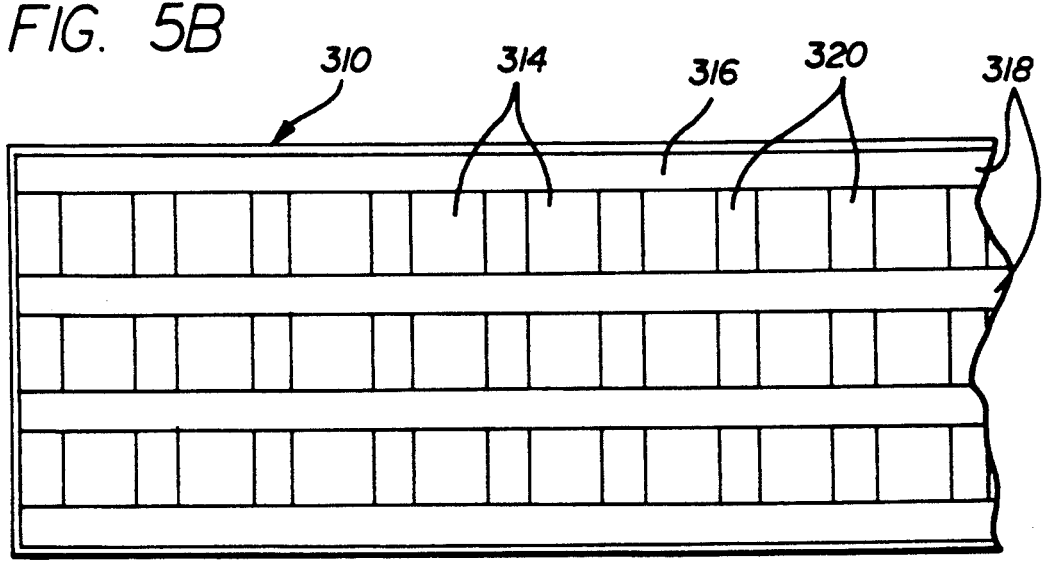
FIG. 5C is a fragmentary plan view of a photovoltaic module containing the same number of photovoltaic cells as the modules of FIGS. 5A and 5B, wherein each module is surrounded by elongated specular reflectors constructed according to the present invention.

FIGS. 5A, 5B, and 5C illustrate three possible module configurations using conventional square photovoltaic cells. FIG. 5A shows a prior art photovoltaic module 110 made up of three strings 112 of photovoltaic cells 114 arranged side-by-side to cover the entire module. Photovoltaic cells in this embodiment are preferably 4 inches by 4 inches (10.16 cm × 10.16 cm), providing a maximum power of approximately 53 watts.

FIG. 5B depicts a reflective photovoltaic module 210 having three continuous strings 212 of photovoltaic cells 214 which are spaced apart by elongated specular reflectors 216 disposed alongside the strings. The specular reflectors 216 are similar to the reflectors 16 of the photovoltaic module 10 (see FIG. 1), but are proportionately wider and deeper because the photovoltaic cells 214 are wider than the photovoltaic cells 14 of the module 10. In keeping with the preference that the specular reflectors be half as wide as the cells they abut, the specular reflectors 216 are preferably 2 inches wide (5.08 cm). As with the photovoltaic module 10, the specular reflectors 216 are located between the strings of photovoltaic cells and on either side of the module, causing each string of cells to be bordered by specular reflectors at both of its longitudinal edges. The maximum power of the module 214 is increased over that of the closely-packed module 114 by a factor of approximately 50% or more, yielding between 70 and 80 watts.

FIG. 5C illustrates a reflective photovoltaic module 310 having a number of photovoltaic cells 314 equal to the number of cells 114 of the module 110; however, the cells 314 are spaced from each other as well as from the outer edge of the module by a grid-like specular reflector 316 which is similar in reflective properties to the reflectors 216 of the module 210. The specular reflector 316 is therefore trough-like and has a compound parabolic cross section. It surrounds each of the cells 314 to direct additional solar radiation onto the cells. As shown in FIG. 5C, the specular reflector 316 may comprise four elongated segments 318 which are identical to the reflectors 216 of the module 210. The elongated mirror segments 318 are then connected in a perpendicular direction by a plurality of short segments 320 to form a grid. This specific structure avoids the need to modify the parabolic profiles of the segments where they intersect, but has the disadvantage of not capturing all light incident on the panel in these areas. A different grid structure (not shown) having a modified curvature at the points of intersection may be provided to further enhance output power, if desired. In the configuration of FIG. 5C, the 36 photovoltaic cells are capable of producing an output as high as 95 to 100 watts. This represents an increase of almost 100% over the same number of photovoltaic cells in the module 110 of FIG. 5A.

In another embodiment, the elongated specular reflectors of the present invention are formed as a plurality of planar reflective segments, such as the V-shaped specular reflector identified as 416 in FIG. 6. The reflector 416 is disposed behind a region 420 of transparent material which can be combined with a front cover 422 to form a single, integral body of transparent material of suitable refractive index. It should be understood, of course, that this construction of the front cover and the corresponding transparent regions as an integral unit is not limited to the embodiment of FIG. 6, but is applicable broadly to the structures of FIGS. 2 and 7, and all other embodiments of this invention.

The planar reflector 416 functions in the same general way as the reflector 16 of FIGS. 2 and 3, except that the light rays impinging on the reflector 416 are not focussed on the outer surface of the front cover 422. Instead, incoming light is reflected by each side of the reflector 416 along parallel light paths 430 for internal reflection at a plurality of regions 432 on the surface of the front cover 422. This doubly-reflected light ultimately impinges on the photovoltaic cell 414B for conversion to electrical energy. Thus, although the distribution of light on the adjoining cells 414A and 414B is different for the reflector 416 than for a reflector having a curved contour, the amount of light reaching the cells is enhanced in a similar way.

In yet another embodiment, the specular reflectors 16, 216, 316, or 416 may be formed as a "collapsed" reflector 516 having a plurality of distinct parabolic or planar segments connected together in a sawtooth fashion, as illustrated in FIG. 7. The reflector 516 has a region 520 of transparent material with a bottom surface made up of a plurality of parabolic reflective segments 518 essentially similar in curvature to the parabolic segment 18A of the mirror structure of FIG. 2. Alternately, the segments 518 can be planar segments substantially parallel to the corresponding portions of the reflector 416 of FIG. 6. Each of the segments 518 is configured to reflect solar radiation incident thereon back into a transparent front cover 522 for internal reflection onto an adjoining photovoltaic cell (not shown). In this way, the function of the specular reflectors 16, 216, 316 and 416 (FIGS. 2, 5B, 5C, and 6, respectively) can be obtained with a much thinner structure.

The efficiency of the module structure of the present invention is affected by the optical clarity of its transparent elements, including the transparent front cover, the pottant layers, and the transparent bodies of the mirror structure, as well as by the reflectivity of the mirror coating. Gold is the most reflective material for the mirror coating, followed in order of preference by silver and aluminum. Considering both reflectivity and cost factors, silver is the preferred material.

As with any photovoltaic module, the efficiency of the reflective photovoltaic module of the present invention is also affected by the conditions under which it operates. Fortunately, the module of the invention is relatively tolerant to the direction of incoming light and thus to the time of day in which it is used. It is able to capture and convert useful solar radiation over a five to six hour period of an average day. It is, however, somewhat more sensitive than a conventional photovoltaic module to the amount of haze in the sky.

From the above, it can be seen that the module of the present invention permits additional radiation to be reflected onto solar cells or other photovoltaic cells to increase output power without deviating from a substantially flat panel design. Primary specular reflectors are located alongside the photovoltaic cells, either at or behind the plane of the cells.

The appended claims are not limited to the embodiments described herein, but rather are intended to cover all variations and adaptations falling within the true scope and spirit of the present invention. For example, the reflective structures need not be either parabolic or planar, but can be any other shape suitable for redirecting incident light back into a transparent front cover for internal reflection onto adjacent cells. The front cover also need not be flat, as illustrated herein, but can have any other contour and make-up suitable for reflecting onto the cells a large proportion of the radiation redirected into it by the reflective structures. The cells themselves can be of any desired shape, such as circular or hexagonal, rather than rectangular. In such cases, the reflective structure may have a relatively complex contour designed to reflect incident radiation back through a portion of the front cover for subsequent reflection onto the cells.

What is claimed is:

1. A photovoltaic module comprising:
   a light-receiving structure having a substantially transparent front cover portion;
   a plurality of photovoltaic cells disposed along a preselected plane behind and substantially parallel to the front cover portion to receive radiation transmitted thereby;
   a plurality of specular reflectors oblique to said preselected plane and disposed alongside the photovoltaic cells to direct radiation incident thereon back into the front cover portion and onto the photovoltaic cells for conversion to electrical energy;
   said specular reflectors extending behind said preselected plane.

2. The photovoltaic module of claim 1 wherein:
   said specular reflectors comprise reflective surfaces configured to reflect radiation incident thereon back into the front cover portion for internal reflection onto the photovoltaic cells.

3. The photovoltaic module of claim 2 wherein:
   said reflective surfaces are substantially concave.

4. The photovoltaic module of claim 2 wherein:
   said reflective surfaces have curved portions.

5. The photovoltaic module of claim 4 wherein:
   said curved portions are of compound curvature.

6. The photovoltaic module of claim 4 wherein:
   said curved portions are of compound parabolic curvature.

7. The photovoltaic module of claim 2 wherein:
   said reflective surfaces have planar portions.

8. The photovoltaic module of claim 7 wherein:
   the light-receiving structure further comprises regions of transparent material extending from said front cover portion to said reflective surfaces.

9. The photovoltaic module of claim 8 wherein:
   said regions of transparent material comprise a synthetic polymeric material transparent to solar radiation.

10. The photovoltaic module of claim 8 wherein:
    the front cover portion and said regions of transparent material are integral with one another.

11. The photovoltaic module of claim 8 wherein:
    said reflective surfaces comprise a reflective coating on said regions of transparent material.

12. The photovoltaic module of claim 2 wherein:
    the front cover portion is substantially planar; and
    reflective surfaces are spaced behind the front cover portion.

13. The photovoltaic module of claim 1 wherein:
    the front cover portion has a substantially flat outer surface oriented to receive incoming radiation;
    the photovoltaic cells are disposed in a common plane; and
    the specular reflectors comprise trough-like reflective surfaces located between said photovoltaic cells and parallel to the edges thereof to reflect radiation incident on the reflectors back into the front cover portion at an angle causing it to be reflected internally at said front surface and directed onto the photovoltaic cells.

14. The photovoltaic module of claim 13 wherein:

the light-receiving structure further comprises regions of transparent material extending from said front cover portion to said reflective surfaces.

15. The photovoltaic module of claim 1 wherein:

the photovoltaic cells are arranged in a plurality of strings; and the reflectors comprise elongated reflective surfaces parallel to said strings.

16. The photovoltaic module of claim 15 wherein:

the photovoltaic cells are strip cells.

17. The photovoltaic module of claim 15 wherein:

said elongated reflective surfaces are approximately one-half as wide as the strings of photovoltaic cells.

* * * * *